United States Patent
Hedevang et al.

(10) Patent No.: US 11,148,523 B2
(45) Date of Patent: Oct. 19, 2021

(54) METHOD FOR CONTROLLING A FILLING PROCESS OF AN OPERATING FLUID CONTAINER, AND OPERATING FLUID CONTAINER SYSTEM

(71) Applicant: KAUTEX TEXTRON GMBH & CO. KG, Bonn (DE)

(72) Inventors: Poul Hedevang, Bonn (DE); Stefan Wind, Hennef (DE); Hartmut Wolf, Koenigswinter (DE); Axel Barkow, Huerth (DE); Roman Bouffier, Koenigswinter (DE); Ibrahim Koukan, Cologne (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 0 days.

(21) Appl. No.: 16/485,014

(22) PCT Filed: Jan. 18, 2018

(86) PCT No.: PCT/EP2018/051184
§ 371 (c)(1),
(2) Date: Aug. 9, 2019

(87) PCT Pub. No.: WO2018/145873
PCT Pub. Date: Aug. 16, 2018

(65) Prior Publication Data
US 2020/0001704 A1    Jan. 2, 2020

(30) Foreign Application Priority Data
Feb. 10, 2017 (DE) .................. 10 2017 202 151.9

(51) Int. Cl.
*B60K 15/035* (2006.01)
*B60K 15/04* (2006.01)
*B60K 15/03* (2006.01)

(52) U.S. Cl.
CPC ............ *B60K 15/03519* (2013.01); *B60K 2015/0319* (2013.01); *B60K 2015/03217* (2013.01);
(Continued)

(58) Field of Classification Search
CPC ............ B60K 15/035; B60K 15/03519; B60K 2015/0319; B60K 2015/03217;
(Continued)

(56) References Cited

U.S. PATENT DOCUMENTS 5,568,828 A * 10/1996 Harris ................. B60K 15/04
137/514.5
5,590,697 A * 1/1997 Benjey ............ B60K 15/03519
137/202
(Continued)

FOREIGN PATENT DOCUMENTS

| DE | 19738198 | 3/1999 |
|----|----------|--------|
| DE | 19901080 | 7/2000 |

(Continued)

OTHER PUBLICATIONS

English translation of International Search Report dated May 23, 2018, received in corresponding PCT Application No. PCT/EP2018/051184.
(Continued)

*Primary Examiner* — Timothy P. Kelly
*Assistant Examiner* — Stephanie A Shrieves
(74) *Attorney, Agent, or Firm* — Grossman, Tucker, Perreault & Pfleger, PLLC (57) ABSTRACT

A method for controlling a filling process of an operating fluid container, which can be filled by a filling device via a filling tube opening into the operating liquid container, wherein the operating fluid container is provided with a venting valve, which can be electrically operated between an open position, in which the operating liquid container is
(Continued)

fluidically connected to the atmosphere, at least indirectly, by the venting valve, and a closed position, in which the operating fluid container is fluidically separated from the atmosphere by the venting valve.

14 Claims, 3 Drawing Sheets

(52) U.S. Cl.
CPC ............... *B60K 2015/03302* (2013.01); *B60K 2015/03576* (2013.01)

(58) Field of Classification Search
CPC ........... B60K 2015/03302; B60K 2015/03576; B60K 15/04; B60K 2015/0394; B67C 3/2617; B67C 3/262; B67C 3/2622; B67C 3/2625; B67C 3/2628; B67C 3/2631; B67D 7/44; B67D 7/445; B67D 7/46; B67D 7/465
USPC ........................................................ 141/192
See application file for complete search history.

(56) References Cited

U.S. PATENT DOCUMENTS

| | | | | |
|---|---|---|---|---|
| 6,289,947 | B1 * | 9/2001 | Heimbrodt | B60K 15/035 |
| | | | | 141/128 |
| 7,882,824 | B2 * | 2/2011 | Hill | B60K 15/03504 |
| | | | | 123/521 |
| 9,803,593 | B2 * | 10/2017 | Kimoto | F02M 25/08 |
| 2003/0221675 | A1 * | 12/2003 | Washeleski | F02M 25/089 |
| | | | | 123/497 |
| 2005/0279406 | A1 * | 12/2005 | Atwood | B60K 15/035 |
| | | | | 137/39 |
| 2006/0086342 | A1 | 4/2006 | Studebaker et al. | |
| 2009/0107580 | A1 * | 4/2009 | Enge | B60K 15/035 |
| | | | | 141/95 |
| 2009/0150041 | A1 * | 6/2009 | Hill | F02M 25/0854 |
| | | | | 701/102 |
| 2011/0166765 | A1 * | 7/2011 | DeBastos | F02D 41/021 |
| | | | | 701/102 |
| 2011/0284125 | A1 * | 11/2011 | Hagen | F02M 25/089 |
| | | | | 141/45 |
| 2014/0117015 | A1 * | 5/2014 | Kraus | B60K 13/04 |
| | | | | 220/86.1 |
| 2016/0115907 | A1 | 4/2016 | Hagen | |

FOREIGN PATENT DOCUMENTS

| | | | | |
|---|---|---|---|---|
| DE | 10020000 | | 12/2001 | |
| DE | 102015012656 | | 4/2016 | |
| EP | 2993069 | | 3/2016 | |
| GB | 2246434 | A * | 1/1992 | ............. B67D 7/362 |
| GB | 2272894 | A * | 6/1994 | ....... B60K 15/03504 |
| WO | 2015181375 | | 12/2015 | |
| WO | 2016116348 | | 7/2016 | |
| WO | WO-2016116348 | A1 * | 7/2016 | ....... B60K 15/03519 |
| WO | 2017045831 | | 3/2017 | |

OTHER PUBLICATIONS

English translation of Written Opinion dated May 23, 2018, received in corresponding PCT Application No. PCT/EP2018/051184.

* cited by examiner

METHOD FOR CONTROLLING A FILLING PROCESS OF AN OPERATING FLUID CONTAINER, AND OPERATING FLUID CONTAINER SYSTEM

FIELD

The present invention relates to a method for controlling a filling process of an operating fluid container. The present invention also relates to an operating fluid container system for performing the method.

BACKGROUND

In the following text, reference is made to operating fluid containers designed as fuel containers or as fuel tanks and to operating fluid container systems designed as fuel container systems. In the context of the invention, operating fluid containers are in particular, but not exclusively, fuel containers (for gasoline or diesel fuels), urea containers, windscreen wash containers, oil containers, secondary fluid containers or additive containers, in each case for motor vehicles. Operating fluid containers of the type mentioned at the beginning are often produced by extrusion blow molding, HDPE (high-density polyethylene) being suitable in particular for the production of extrusion blow-molded containers. It is also possible to produce corresponding operating fluid containers by means of an injection-molding process. Furthermore, operating fluid containers made of metal may also be used.

It is known from the prior art that, for venting a fuel container, it has at least one venting valve, which in turn is fluidically connected to a venting line for discharging the excess pressure to the atmosphere. In particular in the case of fuel containers designed for gasoline, their venting lines are often fluidically connected to activated-carbon filters for passing through and filtering out fuel vapors. After passing the activated-carbon filter, the gases filtered by the activated-carbon filter are discharged to the atmosphere. When filling a fuel container, the venting valve is in its open position, in order that gas driven out from the fuel container during filling (a mixture of fuel vapor and air) can be discharged to the atmosphere—possibly filtered through an activated-carbon filter. A filling stop is initiated by the venting valve being closed by the fuel rising up in the fuel container, as a result of which a discharge of the gases/vapors that are in the fuel container via the venting valve is prevented. By introducing further fuel via a filler pipe opening out into the interior space in the fuel container, the pressure within the fuel container rises, so that a fuel level within the filler pipe also rises, until the fuel level closes a fuel-pump nozzle inserted into the filler pipe, whereupon an outflow of fuel is ended by the fuel-pump nozzle.

When there is a sudden filling stop, that is to say the ending of the outflow of fuel from the fuel-pump nozzle, there can be a surging of the fuel in the filler pipe, as a result of which fuel can spill out from the filling orifice of the filler pipe.

After the fuel-pump nozzle is shut off for the first time, the person filling the tank often also carries out a topping up, in which further fuel is successively introduced into the filler pipe. The fuel introduced into the filler pipe then flows into the fuel container as a result of a predetermined leakage of the venting valve and corresponding reduction of the pressure in the fuel container. In the case of corresponding topping-up operations, there may be a spilling out of fuel from the filler pipe. There is also the problem that, in the case of a corresponding topping up, the fuel container is overfilled.

The present invention is based on the object of providing a method for controlling a filling process of an operating fluid container by means of which controlled filling is made possible, by means of which a predefined filling amount of the operating fluid container can always be exactly achieved, and by means of which less operating fluid spills out from the filler pipe during the filling process and also during a topping-up operation.

SUMMARY

This object on which the present invention is based is achieved by a method for controlling a filling process of an operating fluid container.

To be more precise, the object on which the present invention is based is achieved by a method for controlling a filling process of an operating fluid container, wherein the operating fluid container can be filled via a filler pipe opening out into it by means of a filling device and has a venting valve, which can be electrically actuated between an open position, in which the operating fluid container is fluidically connected to the atmosphere, at least indirectly, by means of the venting valve, and a closed position, in which the operating fluid container is fluidically separated from the atmosphere by means of the venting valve. The method according to the invention has the following method steps:

a) moving the venting valve into its open position;
b) determining a filling level of the operating fluid container;
c) reducing a venting volume flow through the venting valve if the filling level of the operating fluid container has reached or exceeded a predetermined shut-off filling level;
d) determining a filling stop of the filling device; and
e) moving the venting valve into its closed position after a predetermined time period after determining the filling stop.

The method according to the invention for controlling a filling process of an operating fluid container has many advantages. One advantage is that a topping-up amount of operating fluid intended for a topping-up operation can be defined, as a result of which the topping-up operation proceeds in a controlled manner A further advantage is that, when or shortly after there is a filling stop, that is to say an ending of filling of operating fluid into the filler pipe by means of the filling device, a speed at which an operating fluid column rises in the filler pipe is reduced, and consequently a surging of an operating fluid in the filler pipe of the operating fluid container is reduced considerably, which has the result that, when there is a filling stop, considerably less operating fluid or no operating fluid at all spills out from the filler pipe into the surroundings of the operating fluid container. A further advantage is that, by means of the method according to the invention, a filler nozzle can be of a structurally simpler design, since the speed at which the operating fluid column rises is reduced, so that less in the way of structural or structural design measures have to be taken to counteract spilling out of operating fluid from the filler nozzle.

This is so because, by reducing the effective venting cross-sectional area of the venting valve, a venting volume flow through the venting valve is reduced, as a result of which a positive pressure that can be set by setting the venting volume flow builds up in the operating fluid container during a filling process. The buildup of a positive pressure in the operating fluid container in turn presupposes that the venting volume flow through the venting valve is less than a filling volume flow by means of the filling device. If, for example, the filling device delivers a filling volume flow of 40 l/min, but the venting volume flow through the venting valve is less than 40 l/min (for example 20 l/min), the pressure within the operating fluid container then increases. The pressure buildup has in turn the consequence that the operating fluid rises up within the filler pipe. The operating fluid in this case rises up within the filler pipe more slowly than if the venting valve were moved completely into its closed position. As a result of the slower rising of the operating fluid within the filler pipe, no operating fluid, or a considerably smaller amount of operating fluid, spills out from the filler pipe when there is a filling stop, which is usually initiated by closing an expansion port of the filling device by means of the operating fluid rising up in the filler pipe.

Since, after determining the filling stop of the filling device, for the predetermined time period the venting valve remains open, and consequently the operating fluid container continues to be fluidically connected to the atmosphere by means of the venting valve, a level of the operating fluid within the filler pipe falls to a predetermined height. Consequently, after reaching the shut-off filling level and after the filling stop, a reproducible height of the level within the filler pipe is always realized, so that a topping-up operation always begins with a predetermined height of the level within the filler pipe.

Preferably, in method step a), the venting valve is moved into its open position when a filling event or a filling desire is determined. Preferably, a filling event or a filling desire is determined when an opening of a tank flap of the motor vehicle is detected, that is to say when the tank flap is moved from its closed position into its open position. Also preferably, a filling event or a filling desire is determined when the insertion of a filling device (of a fuel-pump nozzle) into the filler pipe is detected. Furthermore, a filling event may also be determined by a signal by the driver and/or by a signal transmitted from a fuel pump.

Method step b) is performed continuously or repeatedly at regular intervals of time, at least up to the point in time by which the filling level of the operating fluid container has reached the predetermined shut-off filling level.

Preferably, in method step b), the filling level of the operating fluid container is determined by means of a filling level indicator. The filling level indicator is preferably designed as a lever indicator, having a float, or as an ultrasonic filling level sensor or as a capacitive filling level sensor. To this extent, there are no restrictions on the design of the filling level indicator.

A reduction of the venting volume flow means a reduction of the amount of gases driven out from the operating fluid container through the venting valve when there is a predetermined difference in pressure between the interior space in the operating fluid container and the exterior space around the operating fluid container.

The venting volume flow is proportional to a pressure difference between the interior space in the operating fluid container and the exterior space around the operating fluid container. Furthermore, the venting volume flow is proportional to a flow resistance of the venting valve or to the flow resistance through the venting valve.

According to the invention, the venting volume flow is changed by changing the flow resistance of the venting valve. To be more precise, according to the invention the venting volume flow is reduced by increasing the flow resistance of the venting valve.

The flow resistance is preferably changed by alternating opening and closing of the venting valve. The slower the closing phases of the venting valve are in comparison with the opening phases of the venting valve, the greater the resultant flow resistance of the venting valve, and the smaller the venting volume flow. In this case, a valve body is preferably electrically moved back and forth in the direction of an open position and in the direction of a closed position. It is not necessary that the valve body completely closes a valve seat of the venting valve. A reduction of a distance of the valve body from the valve seat is already enough to increase the flow resistance of the venting valve.

The venting volume flow is preferably averaged over a given time. Preferably, the venting volume flow is averaged over 0.05 s, more preferably over 0.1 s, more preferably over 0.2 s and more preferably over 0.3 s.

The venting valve is preferably designed as a proportional valve, so that the venting valve can be adjusted continuously between an open position, in which the flow resistance of the venting valve is at a minimum, and a closed position, in which the flow resistance of the venting valve is at a maximum. In the open position, a distance between a valve body and a valve seat is preferably at a maximum, whereas in the closed position the valve body closes the valve seat, so that in the closed position of the venting valve the latter fluidically separates the interior space in the operating fluid container from the atmosphere. As a result, an effective venting cross-sectional area of the venting valve is changed. The effective venting cross-sectional area of the venting valve is the free opening (surface area of the opening) of the venting valve through which the gas driven out from the operating fluid container must flow (during a filling process). The effective venting cross-sectional area may also be referred to as the effective venting opening of the venting valve.

The venting cross-sectional area of the venting valve is the free opening (surface area of the opening) of the venting valve through which the gas driven out from the operating fluid container (during a filling process) must flow. The effective venting cross-sectional area may also be referred to as the effective venting opening of the venting valve.

If the effective venting cross-sectional area of the venting valve is reduced, the venting valve is operated/moved into an intermediate position between the open position and the closed position.

The venting valve has in its open position a type-dependent maximum venting cross-sectional area. In the closed position of the venting valve, the venting cross-sectional area is preferably zero.

In method step c), the venting cross-sectional area of the venting valve is reduced to a smaller area than the maximum venting cross-sectional area. Preferably, in method step c), the effective venting cross-sectional area is reduced to less than 60%, more preferably to less than 50%, more preferably to less than 40%, more preferably to less than 30%, more preferably to less than 20% and more preferably to less than 10% of the maximum venting cross-sectional area.

The reducing of the effective venting cross-sectional area is preferably realized by partially and/or steplessly closing a valve seat of the venting valve by means of a valve body of the venting valve. In the open position of a correspondingly designed venting valve, the valve body has a venting-valve-specific maximum distance from the valve seat, which may also be referred to as the valve opening. In the closed position of a correspondingly designed venting valve, the valve body closes the valve seat, so that the venting cross-sectional area is zero.

A venting valve may also have a venting opening, which can be varied/changed by means of a slide that can be operated/displaced perpendicularly in relation to a normal to the surface of the venting opening. Furthermore, a venting valve may have a throttle flap. According to the invention, there are no restrictions on the design of the venting valve.

The filling device may also be referred to as an operating fluid dispensing device. The filling device is usually designed as a fuel-pump nozzle.

In method step d), the filling stop of the filling device is preferably determined by means of a sound sensor. When the filling process is ended, the filling device generates a characteristic noise, which can be detected by means of a sound sensor, which is preferably coupled to a frequency filter, which only allows the frequencies characteristic of the shut-off process to pass through.

The shut-off filling level may also be referred to as the shut-off filling volume.

Preferably, the method is designed in such a way that a first venting volume flow through the venting valve after a determination that the filling level of the operating fluid container has reached or exceeded the predetermined shut-off filling level, and before the beginning of the predetermined time period, differs from a second venting volume flow through the venting valve during the predetermined time period.

Preferably, the first venting volume flow is less than the second venting volume flow. More preferably, the first venting volume flow is greater than the second venting volume flow.

Preferably, the method is designed in such a way that the venting volume flow is changed by intermittently actuating the venting valve between its open position and its closed position.

Preferably, the method is designed in such a way that it has the following method steps:
b1) determining a filling speed at which the operating fluid container is filled with the operating fluid; and
b2) determining a reduction of the venting volume flow by which the venting volume flow through the venting valve is reduced after reaching the shut-off filling level, as a function of the filling speed, wherein the reduction of the venting volume flow is falling as the filling speed increases.

The correspondingly designed method offers the advantage that, when or shortly after the filling process is ended, independently of filling speed, and consequently independently of the filling rate, of the filling device, even less operating fluid spills out from the filler pipe into the surroundings of the operating fluid container, since the reduction of the venting volume flow is lower when there is a great filling speed, and consequently greater filling rate, than when there is a lower filling speed/filling rate. Consequently, independently of the filling rate or independently of the filling speed, after reaching the predetermined shut-off filling level, a substantially constant and/or settable speed at which the operating fluid rises up within the filler pipe can always be achieved.

The filling speed is preferably determined on the basis of the filling level determined in method step b) and on the basis of the time required to reach this filling level.

As an alternative and/or in addition, the filling speed is determined by means of a flow measuring device arranged in the filler pipe.

Also as an alternative and/or in addition, the filling speed is sent via a preferably wireless data line from the filling device.

More preferably, the method is designed in such a way that it has the following method steps:
f) determining a further filling stop of the filling device;
g) setting a venting volume flow through the venting valve (30) when the further filling stop is determined;
h) moving the venting valve into its closed position after a predetermined second time period after determining the filling stop.

The correspondingly designed method offers the advantage that controlled topping-up operations are made possible, no operating fluid, or at least a reduced amount of operating fluid, spilling out from the filler pipe during the topping-up operations, since the speed at which the operating fluid rises up within the filler pipe is reduced in comparison with control methods known from the prior art.

The venting volume flow set in method step g) is smaller/less than a maximum venting volume flow through the venting valve. With the maximum venting volume flow through the venting valve, a distance of a valve body from the valve seat of the venting valve is at a maximum.

Method step f) is carried out continuously or at regular intervals of time.

The second time period is preferably shorter/less than the predetermined time period in which, in method step e), the venting valve remains in its intermediate position between its open position and its closed position after determining the filling stop.

If the venting valve is designed as a proportional valve and can be adjusted continuously between its open position and closed position, then method step g) is equivalent to moving the venting valve into an intermediate position between the open position and the closed position when the further filling stop is determined.

In the intermediate position between the open position and the closed position, the venting valve has a venting cross-sectional area that is smaller than its maximum venting cross-sectional area.

In method step h), the venting valve may as an alternative or in addition be moved into its closed position after a predetermined number of topping-up operations.

The object on which the present invention is based is also achieved by a method for controlling a filling process of an operating fluid container which can be filled via a filler pipe opening out into the operating fluid container by means of a filling device, wherein there is arranged in the operating fluid container an electrically actuable outlet valve, which can be electrically actuated between an open position, in which the filler pipe is fluidically connected to an interior space in the operating fluid container by means of the outlet valve, and a closed position, in which the filler pipe is fluidically separated from the interior space in the operating fluid container by means of the outlet valve. The method according to the invention has the following method steps:
a) moving the outlet valve into its open position;
b) determining a filling level of the operating fluid container;
c) reducing an opening cross-sectional area of an opening of the outlet valve fluidically connecting the filler pipe to the interior space in the operating fluid container if the filling level of the operating fluid container has reached or exceeded a predetermined shut-off filling level;
d) determining a filling stop of the filling device; and
e) moving the outlet valve into its closed position after a predetermined time period after determining the filling stop.

The method according to the invention for controlling a filling process of an operating fluid container has many advantages. One advantage is that a topping-up amount of operating fluid intended for a topping-up operation can be defined, as a result of which the topping-up operation proceeds in a controlled manner A further advantage is that, when or shortly after there is a filling stop, that is to say an ending of filling of operating fluid into the filler pipe by means of the filling device, a speed at which an operating fluid column rises up in the filler pipe is reduced, and consequently a surging of an operating fluid in the filler pipe of the operating fluid container is reduced considerably, which has the result that, when there is a filling stop, considerably less operating fluid or no operating fluid at all spills out from the filler pipe into the surroundings of the operating fluid container. A further advantage is that, by means of the method according to the invention, a filler nozzle can be of a structurally simpler design, since the speed at which the operating fluid column rises up is reduced, so that less in the way of measures have to be taken to counteract spilling out of operating fluid from the filler nozzle.

This is so because, by reducing the opening cross-sectional area of the outlet valve, an outflow flow rate of the operating fluid from the filler pipe into the operating fluid container, to be more precise into the interior space in the operating fluid container, is reduced, which in turn has the consequence that the operating fluid rises up within the filler pipe. The operating fluid in this case rises up within the filler pipe more slowly than if the outlet valve were moved completely into its closed position. As a result of the slower rising of the operating fluid within the filler pipe, no operating fluid, or a considerably smaller amount of operating fluid, spills out from the filler pipe when there is a filling stop, which is usually initiated by closing an expansion port of the filling device by means of the operating fluid rising up in the filler pipe.

Since, after determining the filling stop of the filling device, for the predetermined time period the outlet valve remains in the position in which the opening cross-sectional area is reduced or, after moving into the closed position, for the predetermined time period is moved into the position in which the opening cross-sectional area is reduced, and the interior space in the operating fluid container continues to be fluidic ally connected to the filler pipe, a level of the operating fluid within the filler pipe falls to a predetermined height. Consequently, after reaching the shut-off filling level and after the filling stop, a reproducible height of the level within the filler pipe is always realized, so that a topping-up operation always begins with a predetermined height of the level within the filler pipe, so that a defined topping-up volume can be set.

Preferably, in method step a), the outlet valve is moved into its open position when a filling event or a filling desire is determined. Preferably, a filling event or a filling desire is determined when an opening of a tank flap of the motor vehicle is detected, that is to say when the tank flap is moved from its closed position into its open position. Also preferably, a filling event or a filling desire is determined when the insertion of a filling device (of a fuel-pump nozzle) into the filler pipe is detected. Furthermore, a filling event may also be determined by a signal by the driver and/or by a signal transmitted from a fuel pump.

Method step b) is performed continuously or repeatedly at regular intervals of time, at least up to the point in time by which the filling level of the operating fluid container has reached the predetermined shut-off filling level.

Preferably, in method step b), the filling level of the operating fluid container is determined by means of a filling level indicator. The filling level indicator is preferably designed as a lever indicator, having a float, or as an ultrasonic filling level sensor or as a capacitive filling level sensor. To this extent, there are no restrictions on the design of the filling level indicator.

The opening cross-sectional area of the outlet valve is the free opening of the outlet valve through which the operating fluid must flow from the filler pipe into the operating fluid container, to be more precise into the interior space in the operating fluid container (during a filling process).

If the opening cross-sectional area of the outlet valve is reduced, the outlet valve is operated/moved into an intermediate position between the open position and the closed position.

The outlet valve has in its open position a type-dependent maximum opening cross-sectional area. In the closed position of the outlet valve, the opening cross-sectional area is preferably zero.

In method step c), the opening cross-sectional area of the outlet valve is reduced to a smaller area than the maximum opening cross-sectional area. Preferably, in method step c), the opening cross-sectional area is reduced to less than 60%, more preferably to less than 50%, more preferably to less than 40%, more preferably to less than 30%, more preferably to less than 20% and more preferably to less than 10% of the maximum opening cross-sectional area.

The reducing of the opening cross-sectional area is preferably realized by partially closing a valve seat of the outlet valve by means of a valve body of the outlet valve. In the open position of a correspondingly designed outlet valve, the valve body has a venting-valve-specific maximum distance from the valve seat, which may also be referred to as the valve opening. In the closed position of a correspondingly designed opening valve, the valve body closes the valve seat, so that the opening cross-sectional area is zero.

An outlet valve may also have an outlet opening, which can be varied/changed by means of a slide that can be operated/displaced perpendicularly in relation to a normal to the surface of the outlet opening. Furthermore, the outlet valve may have a pivotable flap, by means of which the outlet opening can be closed. According to the invention, there are no restrictions on the design of the outlet valve, which may also be referred to as a nonreturn valve and/or check valve.

The filling device may also be referred to as an operating fluid dispensing device. The filling device is usually designed as a fuel-pump nozzle.

In method step d), the filling stop of the filling device is preferably determined by means of a sound sensor. When the filling process is ended, the filling device generates a characteristic noise, which can be detected by means of a sound sensor, which is preferably coupled to a frequency filter, which only allows the frequencies characteristic of the shut-off process to pass through.

The shut-off filling level may also be referred to as the shut-off filling volume.

Preferably, the method is designed in such a way that it has the following method steps:
b1) determining a filling speed at which the operating fluid container is filled with the operating fluid; and
b2) determining a reduction of the opening cross-sectional area by which the opening cross-sectional area of the outlet valve is reduced after reaching the shut-off filling level, as a function of the filling speed, wherein the reduction of the opening cross-sectional area is falling as the filling speed increases.

The correspondingly designed method offers the advantage that, when or shortly after the filling process is ended, independently of filling speed, and consequently independently of the filling rate, of the filling device, even less operating fluid spills out from the filler pipe into the surroundings of the operating fluid container, since the reduction of the opening cross-sectional area is lower when there is a great filling speed, and consequently greater filling rate, than when there is a lower filling speed/filling rate. Consequently, independently of the filling rate or independently of the filling speed, after reaching the predetermined shut-off filling level, a substantially constant speed at which the operating fluid rises up within the filler pipe can always be achieved.

The filling speed is preferably determined on the basis of the filling level determined in method step b) and on the basis of the time required to reach this filling level.

As an alternative and/or in addition, the filling speed is determined by means of a flow measuring device arranged in the filler pipe.

Also as an alternative and/or in addition, the filling speed is sent via a preferably wireless data line from the filling device.

More preferably, the method is designed in such a way that it has the following method steps:
f) determining a further filling stop of the filling device;
g) moving the outlet valve into an intermediate position between the open position and the closed position when the further filling stop is determined;
h) moving the outlet valve into its closed position after a predetermined second time period (t2) after determining the filling stop.

The correspondingly designed method offers the advantage that controlled topping-up operations are made possible, no operating fluid, or at least a reduced amount of operating fluid, spilling out from the filler pipe during the topping-up operations, since the speed at which the operating fluid rises up within the filler pipe is reduced in comparison with control methods known from the prior art.

In the intermediate position between the open position and the closed position, the outlet valve has an opening cross-sectional area that is smaller than its maximum opening cross-sectional area.

Method step f) is carried out continuously or at regular intervals of time.

The second time period is preferably shorter/less than the predetermined time period in which, in method step e), the outlet valve remains in its intermediate position between its open position and its closed position after determining the filling stop.

Preferably, the method is designed in such a way that the predetermined time period is a function of the difference between a target filling level and the determined filling level.

The predetermined time period t1, which may also be referred to as the first predetermined time period, can consequently be represented as follows as a function of the difference between the target filling level VZ and the determined filling level VI, which may also be referred to as the actual filling level: $t1=f(VZ-VI)$.

The function $f(VZ-VI)$ is preferably monotonously rising. More preferably, the function $f(VZ-VI)$ is linear. More preferably, the function $f(VZ-VI)$ is parabolic.

More preferably, the method is designed in such a way that the function is a function monotonously rising with the difference between the target filling level and the determined filling level, wherein, when there is a difference between the target filling level and the determined filling level of zero, the function is likewise zero.

Consequently, $t1=f(VZ-VI)$; $t1=0$ if $VZ-VI=0$. Therefore, the predetermined time period is 0s if the filling level (actual filling level) is equal to or greater than the target filling level.

The correspondingly designed method has the result that, the greater the difference between the determined filling level, that is to say the actual filling level, and the target filling level is, the further the level of the operating fluid falls in the filler pipe after determining the filling stop, so that in the case of a possible topping-up operation a greater amount of operating fluid can be topped up before a further filling stop is carried out by the filling device. Consequently, the possible topping-up amount becomes all the less the less the difference is between the target filling level and the actual filling level.

The difference between the determined filling level and the target filling level is preferably indicated in liters or in millimeters, wherein, if the filling level is indicated in meters, the level of the operating fluid in the operating fluid container is measured/determined. If the filling level is indicated in liters, the filling volume of the operating fluid container is indicated/determined.

Preferably, the method is designed in such a way that the predetermined second time period is a function of the difference between a target filling level and the determined filling level.

The predetermined second time period t2 can consequently be represented as follows as a function of the difference between the target filling level VZ and the determined filling level VI, which may also be referred to as the actual filling level: $t2=f(VZ-VI)$.

The function $f(VZ-VI)$ is preferably monotonously rising. More preferably, the function $f(VZ-VI)$ is linear. More preferably, the function $f(VZ-VI)$ is parabolic.

More preferably, the method is designed in such a way that the second time period is shorter than the predetermined first time period, in which, in method step e), the venting valve or the outlet valve remains in its intermediate position between its open position and its closing position after determining the filling stop.

The correspondingly designed method consequently allows that successively smaller topping-up amounts are made possible in the topping-up operations. This is often desirable for a person filling a tank, since topping-up amounts that become successively smaller give the person filling the tank the impression that the filling level of the operating fluid container is asymptotically approaching a maximum filling level.

More preferably, the method is designed in such a way that it has the following method steps:
\b1) determining a filling speed at which the operating fluid container is filled with the operating fluid; and
b3) determining the predetermined shut-off filling level as a function of the filling speed, wherein the predetermined shut-off filling level is falling as the filling speed increases.

The correspondingly designed method offers the advantage that, when or shortly after the filling process is ended, even less operating fluid spills out from the filler pipe into the surroundings of the operating fluid container, since the predetermined shut-off filling level is lower when there is a great filling speed, and consequently filling rate, than when there is a lower filling speed/filling rate.

The filling speed is preferably determined on the basis of the filling level determined in method step b) and the time required for reaching this filling level.

As an alternative and/or in addition, the filling speed is determined by means of a flow measuring device arranged in the filler pipe.

Also as an alternative and/or in addition, the filling speed is sent via a preferably wireless data line from the filling device.

The present invention is also based on the object of providing an operating fluid container system that makes a controlled filling process and a controlled topping-up operation possible. This object on which the present invention is based is achieved by an operating fluid container system.

To be more precise, the object on which the present invention is based is achieved by an operating fluid container system for a motor vehicle, wherein the operating fluid container system has
- at least one operating fluid container, in the interior space of which operating fluid container a filler pipe for filling the interior space in the operating fluid container with an operating fluid opens out,
- at least one venting valve for aerating and/or venting the operating fluid container, wherein the venting valve can be electrically actuated between an open position and a closed position, wherein, in the open position, the interior space in the operating fluid container is fluidically connected to the atmosphere, at least indirectly, by means of the venting valve, and wherein, in the closed position, the interior space in the operating fluid container is fluidically separated from the atmosphere by means of the venting valve,
- at least one filling level sensor for determining a filling level of the operating fluid in the operating fluid container, and
- an electronic control device, which is coupled to the filling level sensor via a first data line for receiving data, and which is coupled to the venting valve via a second data line for emitting control signals.

The operating fluid container system according to the invention is characterized in that the control device is designed to perform a method for controlling a filling process of the operating fluid container.

The operating fluid container system according to the invention allows a controlled filling of an operating fluid container in which a topping-up amount for a topping-up operation can be defined, and in which less operating fluid spills out from the filler pipe during the filling process and during a possible topping up.

This is so because, by reducing the effective venting cross-sectional area of the venting valve, a venting volume flow through the venting valve is reduced, as a result of which a positive pressure builds up in the operating fluid container during a filling process. The pressure buildup has in turn the consequence that the operating fluid rises up within the filler pipe. The operating fluid in this case rises up within the filler pipe more slowly than if the venting valve were moved completely into its closed position. As a result of the slower rising up of the operating fluid within the filler pipe, no operating fluid, or a considerably smaller amount of operating fluid, spills out from the filler pipe when there is a filling stop, which is usually initiated by closing an expansion port of the filling device by means of the operating fluid rising up in the filler pipe.

Since, after determining the filling stop of the filling device, for the predetermined time period the venting valve remains in a position in which the effective venting cross-sectional area is reduced and the operating fluid container continues to be fluidically connected to the atmosphere by means of the venting valve, a level of the operating fluid within the filler pipe falls to a predetermined height. Consequently, after reaching the shut-off filling level and after the filling stop, a reproducible height of the level within the filler pipe is always realized, so that a topping-up operation always begins with a predetermined height of the level within the filler pipe.

The operating fluid container preferably has a venting line, in which the venting valve is preferably arranged. The venting valve may however also be arranged between the interior space in the operating fluid container and the venting line. Furthermore, it is also possible that the venting valve is arranged at an end of the venting line remote from the operating fluid container. The venting valve is also preferably integrated in the operating fluid container.

The operating fluid container may be designed for example as a fuel container for receiving a gasoline or diesel fuel. The operating fluid container may also be designed as a urea container for receiving an aqueous urea solution.

In the context of the present invention, electrical actuation of the venting valve should be understood as meaning electromechanical and/or electromagnetic actuation of the venting valve.

To be more precise, the following method steps are performed by the operating fluid container system according to the invention, to be more precise by the electronic control device:
- determining whether a filling process of the operating fluid container has been started; this may for example take place by a sensor in the filler pipe or in a filler nozzle of the filler pipe, which for example detects a fuel-pump nozzle in the filler nozzle of the filler pipe;
- emitting an opening control signal to the venting valve for moving the venting valve into its open position after the determination that a filling process has been started;
- receiving filling level data representing a filling level of the operating fluid container from the filling level sensor;
- comparing the filling level with a predetermined shut-off filling level;
- emitting a reducing control signal to the venting valve if the filling level of the operating fluid container has reached or exceeded the predetermined shut-off filling level;
- determining a filling stop of the filling device; the filling device generates a characteristic noise when the filling process is ended; the filling stop is preferably determined by means of a sound sensor, which can be detected is preferably coupled to a frequency filter, which only allows the frequencies characteristic of the shut-off process to pass through;
- emitting a closing control signal to the venting valve for moving the venting valve into its closed position after a predetermined time period after determining the filling stop.

Preferably, the operating fluid container system is designed in such a way that the venting valve can be electrically adjusted discretely between its open position and its closed position.

A discrete adjustability of the venting valve means that the venting valve can be specifically moved/actuated only into its open position or into its closed position. With a correspondingly designed venting valve, a reduction of the venting volume flow is realized by intermittently adjusting the venting valve between its open position and its closed position. A corresponding intermittent actuation of the venting valve may also be referred to as clocking and/or as pulsing of the venting valve.

Preferably, the operating fluid container system is designed in such a way that the venting valve is designed as a proportional valve and can be electrically adjusted continuously between an open position and its closed position.

Preferably, the operating fluid container system is designed in such a way that it has the following features:

the operating fluid container system also has an electrically actuable outlet valve, which can be electrically actuated between an open position, in which the filler pipe is fluidically connected to the interior space in the operating fluid container, and a closed position, in which the filler pipe is fluidically separated from the interior space in the operating fluid container by means of the outlet valve; and the control device is designed to perform a method for controlling a filling process of the operating fluid container.

The outlet valve, which may also be referred to as a nonreturn valve and/or a check valve, is preferably arranged in the region of the mouth of the filler pipe into the operating fluid container, so that the mouth of the filler pipe can be closed by means of the outlet valve. More preferably, the outlet valve is arranged in the filler pipe.

Preferably, the operating fluid container system has a sound sensor, by means of which a filling stop of a filling device inserted into the filler pipe can be detected, wherein the sound sensor is connected by means of a data line to the control device for transmitting data representing the filling stop to the control device. The sound sensor may also be designed and/or referred to as a vibration sensor. By means of the vibration sensor, vibrations of the operating fluid container system, that is to say of the operating fluid container and/or the filler pipe and/or other components of the operating fluid container system, can be detected.

BRIEF DESCRIPTION OF THE DRAWINGS

Further advantages, details and features of the invention emerge below from the exemplary embodiments explained. Here, specifically.

DETAILED DESCRIPTION

In the description which now follows, the same designations denote the same components or the same features, and so a description given for a component with regard to one figure also applies to the other figures, thereby avoiding a repetitive description. Furthermore, individual features that have been described in conjunction with one embodiment can also be used separately in other embodiments.

Figure 1:
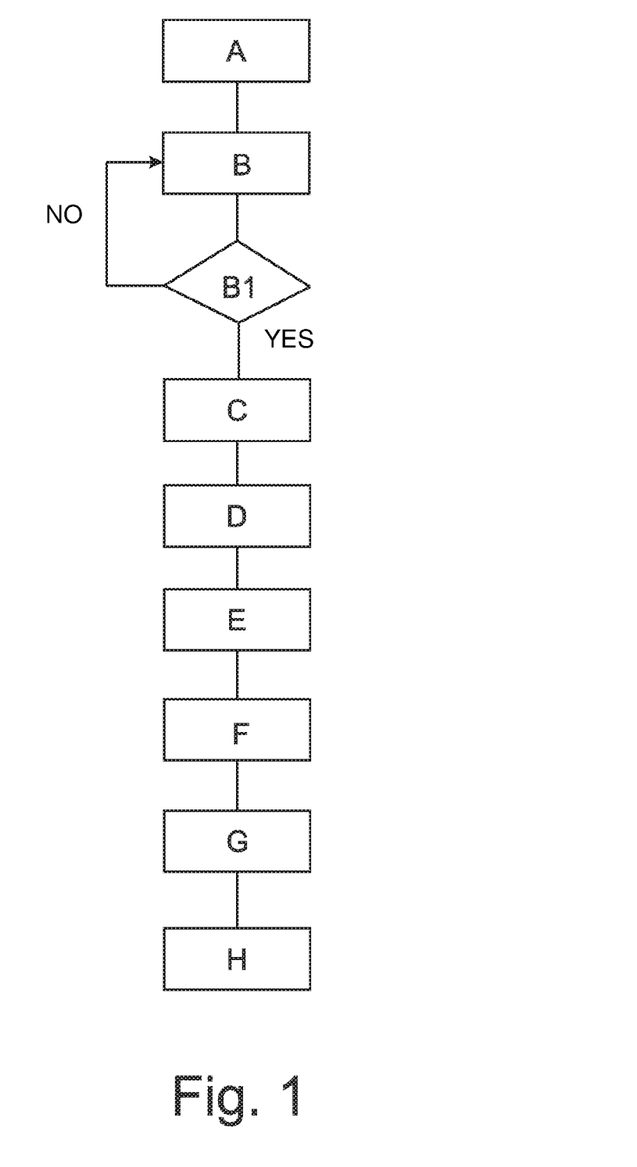
FIG. 1 shows a flowchart of a method according to the invention for controlling a filling process of an operating fluid container.
Figure 3:
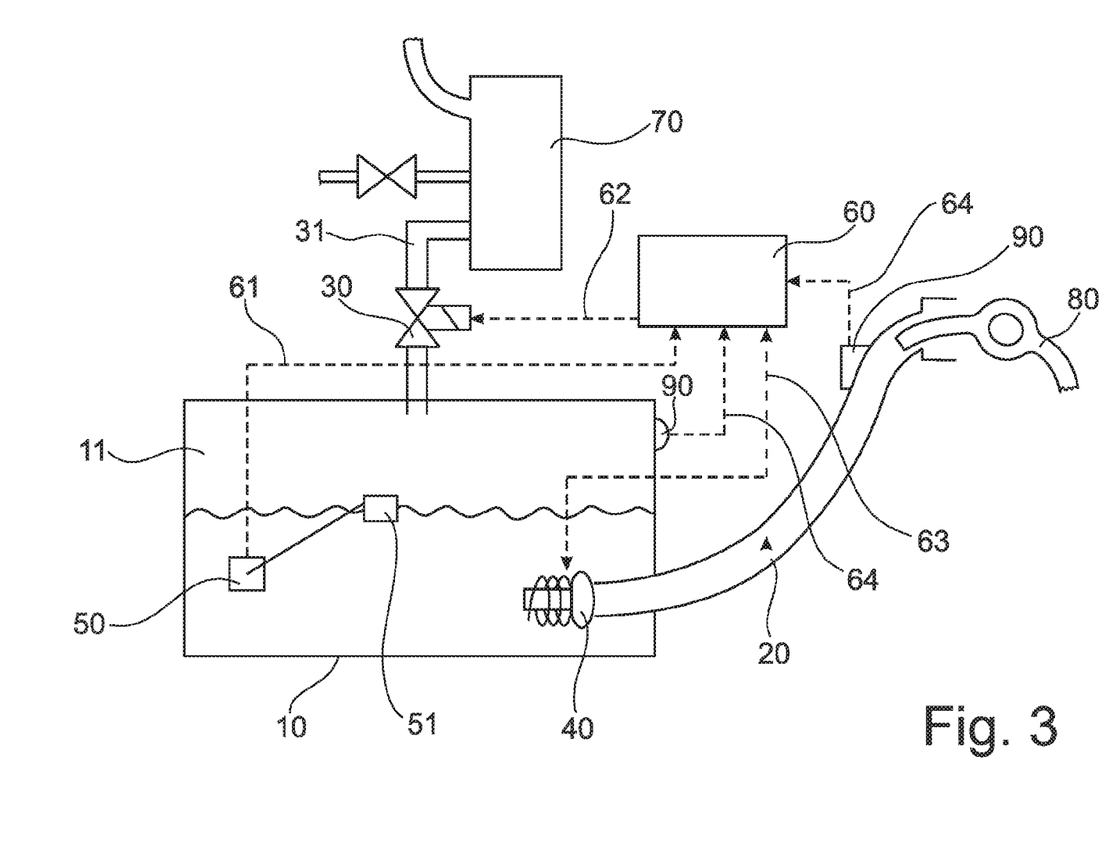
FIG. 3 shows a schematic representation of an operating fluid container system according to the invention.

FIG. 1 shows a flowchart of a method according to the invention for controlling a filling process of an operating fluid container 10, which is schematically represented in FIG. 3.

The operating fluid container 10 is part of an operating fluid container system represented in FIG. 3. This comprises at least one operating fluid container 10, which in the exemplary embodiment represented is designed as a fuel container 10. A filler pipe 20 for filling the interior space 11 in the operating fluid container with an operating fluid opens out into the interior space 11 in the operating fluid container. By means of a filling device 80, designed as a fuel-pump nozzle 80, an operating fluid, in the present exemplary embodiment fuel, can be filled into the interior space 11 in the operating fluid container via the filler pipe 20. The operating fluid container system also has at least one venting valve 30 for aerating and/or venting the operating fluid container 10. In this case, the venting valve 30 can be electrically moved or actuated between an open position and a closed position. Provided for the actuation of the venting valve 30 is an actuator, which in FIG. 3 is schematically represented to the right of the venting valve 30. In the open position of the venting valve 30, the interior space 11 in the operating fluid container is fluidically connected to the atmosphere by means of the venting valve 30. In the case of the exemplary embodiment represented, the interior space 11 in the operating fluid container is fluidically connected indirectly to the atmosphere by means of a venting line 31, which opens out into an adsorption filter 70, designed in the present exemplary embodiment as an activated-carbon filter 70. In the closed position of the venting valve 30, the interior space 11 in the operating fluid container is fluidically separated from the atmosphere by means of the venting valve 30.

The operating fluid container system also has an electrically actuable outlet valve 40, which is arranged at an end of the filler pipe 20 that opens out into the interior space 11 in the operating fluid container. The outlet valve 40 may also be referred to as a nonreturn valve 40 and/or as a check valve 40. Furthermore, it is also possible that the outlet valve 40 may be arranged in the filler pipe 40. The outlet valve 40 can be electrically actuated or adjusted between an open position, in which the filler pipe 20 is fluidically connected to the interior space 11 in the operating fluid container, and a closed position, in which the filler pipe 20 is fluidically separated from the interior space 11 in the operating fluid container by means of the outlet valve 40. The outlet valve 40 is preferably provided with a mechanical nonreturn function/nonreturn element, so that the outlet valve 40 has a nonreturn element with additional enforced closing.

Arranged in the interior space 11 in the operating fluid container is a filling level sensor 50 for determining a filling level of the operating fluid in the operating fluid container 10. In the exemplary embodiment represented, the filling level sensor 50 is designed as a lever indicator 50, which has a float 51, which is connected to the filling level sensor 50 via a lever. The operating fluid container system also has an electronic control device 60, which may also be referred to as an ECU (Electronic Control Unit). The operating fluid container system also has a structure-borne sound sensor device 90, which in the exemplary embodiment represented has two sound sensors 90 or microphones 90. One sound sensor 90 is fastened on the filler pipe 20, and a further sound sensor 90 is fastened on the operating fluid container 10. It goes without saying that the structure-borne sound sensor device 90 may also have just a single sound sensor 90 or more than two sound sensors 90. By means of the sound sensors 90, a noise that is characteristic of when there is a filling stop of the filling device 80 can be detected.

The electronic control device 60 is connected via a first data line 61 to the filling level sensor 50, wherein data representing the filling level of the operating fluid container 10 can be transmitted via the first data line 61 from the filling level sensor 50 to the electronic control device 60. The electronic control device 60 is additionally connected via a second data line 62 to the venting valve 30. Via the second data line 62, control signals can be transmitted from the electronic control device 60 to the venting valve 30. Furthermore, the electronic control device 60 is connected via a third data line 63 to the outlet valve 40. Via the third data line 63, control signals can be transmitted from the electronic control device 60 to the outlet valve 40. The electronic control device 60 is also connected via fourth data lines 64 to the sound sensors 90. Via the fourth data lines 64, signals/data signaling a filling stop can be transmitted from the sound sensors 90 to the electronic control device 60.

In the following text, a method for controlling a filling process of the operating fluid container 10 is described with reference to FIGS. 1 and 2.

If a filling event is detected (1), detectable for example via a sensor within the filler pipe 20 or within a filler nozzle arranged at the end of the filler pipe 20 remote from the operating fluid container 10, in a method step A an opening control signal is emitted by the electronic control device 60 to the venting valve 30, whereupon the venting valve 30 is moved into its open position (2), in which the interior space 11 in the operating fluid container is fluidically connected indirectly to the atmosphere via the venting line 31 and the activated-carbon filter 70. Furthermore, in method step A an opening control signal is emitted by the electronic control device 60 to the outlet valve 40, whereupon the outlet valve 40 is moved into its open position, in which the filler pipe 20 is fluidically connected to the interior space 11 in the operating fluid container.

Subsequently, in a method step B a filling level of the operating fluid container 10 is determined. The filling level is determined by means of the filling level sensor 50, which in the exemplary embodiment represented is designed as a lever indicator. It goes without saying that the filling level sensor 40 may also be designed in any other desired way known from the prior art. The filling level sensor 50 transmits data representing the filling level of the operating fluid container 10 to the electronic control device 60.

Subsequently, in a method step B1 it is checked by means of the electronic control device 60 whether the filling level, which may also be referred to as the actual filling level, of the operating fluid container 10 has reached or exceeded a predetermined shut-off filling level. If the filling level of the operating fluid container 10 is below the predetermined shut-off filling level, the method returns to method step B, whereas the method moves on to method step C if the filling level of the operating fluid container 10 has reached or exceeded the predetermined shut-off filling level.

Figure 2A:
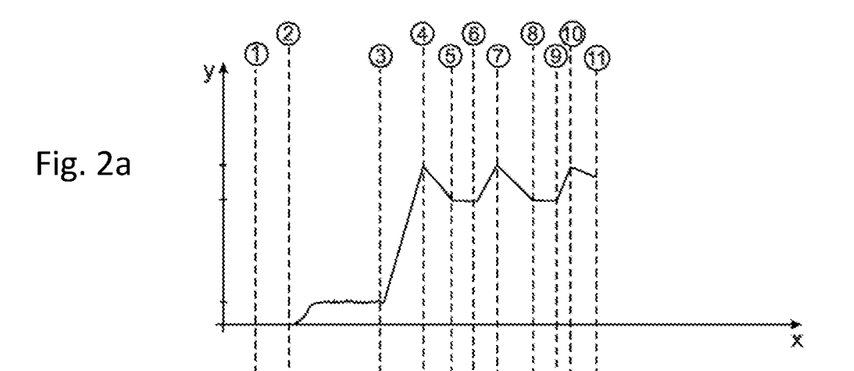
FIGS. 2a-2c show three diagrams for representing the filling level within a filler pipe (FIG. 2a), the filling level of the operating fluid container (FIG. 2b) and the venting volume flow through the venting valve during filling of an operating fluid container (FIG. 2c) by the method according to the invention.
Figure 2B:
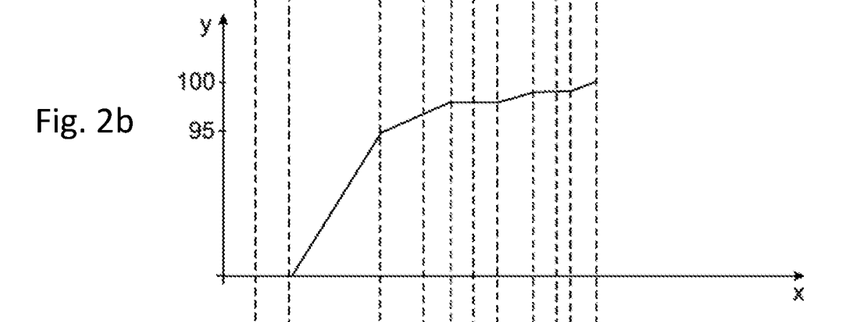
Figure 2C:
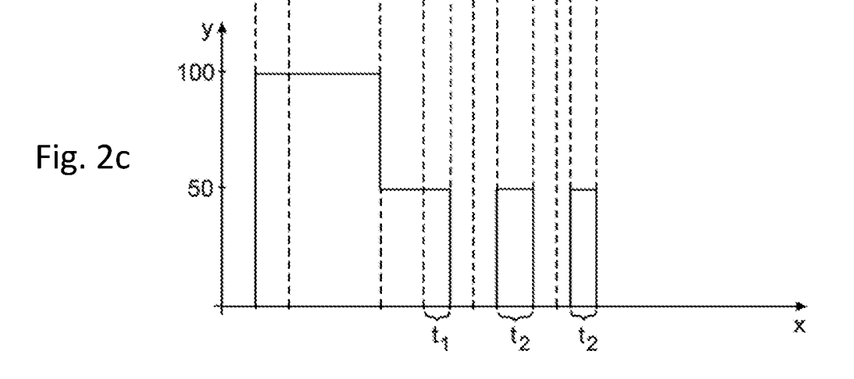

In FIG. 2, the predetermined shut-off filling level is 95% of a target filling level of the operating fluid container 10.

In method step C, a reducing control signal is transmitted by the electronic control device 60 via the second data line 62 to the venting valve 30, whereupon a venting volume flow through the venting valve 30 is reduced (3), it still being ensured that the operating fluid container 10 continues to remain fluidically connected to the atmosphere by means of the venting valve 30.

As an alternative or in addition, in method step C a (further) reducing control signal is transmitted by the electronic control device 60 via the third data line 63 to the outlet valve 40, whereupon an opening cross-sectional area of the outlet valve 40 is reduced (3), it still being ensured that the operating fluid container 10 continues to remain fluidically connected to the filler pipe 20.

In FIG. 2c it can be seen that, when the reducing control signal is received, the venting volume flow through the venting valve 30 is reduced to 50% of a maximum venting volume flow. Since the venting volume flow is reduced, a positive pressure builds up within the operating fluid container 10. This has the consequence that the operating fluid introduced into the filler pipe 20 can flow away more slowly into the interior space 11 in the operating fluid container. This can be seen from FIG. 2b, by the smaller slope of the filling curve after reaching the shut-off filling level. On account of the pressure buildup in the operating fluid container 10, the operating fluid level rises within the filler pipe 20, as can be seen from FIG. 2a. The operating fluid in this case rises up in the filler pipe 20 until a filling stop is performed by the filling device 80 (4).

In a method step D, it is determined whether a filling stop of the filling device 80 has been performed. The filling stop is determined by means of the sound sensor 90. The sound sensors 90 transmit via the fourth data lines 64 a signal representing a filling stop to the electronic control device 60. If no filling stop has been performed, the method stays in method step D, whereas the method moves on to method step E if a filling stop has been determined.

The filling stop can be seen in FIG. 2a, since the operating fluid level reaches a first maximum in the filler pipe 20.

After the elapse of a predetermined first time period t1, in method step E a closing control signal (5) is transmitted from the electronic control device 60 via the second data line 62 to the venting valve 30, whereupon the venting valve 30 fluidically separates the interior space 11 in the operating fluid container from the atmosphere. Although it is not represented in the figures, a first venting volume flow through the venting valve 30 after the determination that the filling level of the operating fluid container 10 has reached or exceeded the predetermined shut-off filling level, and before the beginning of the predetermined time period t1, may differ from a second venting volume flow through the venting valve 30 during the predetermined time period t1. For example, the first venting volume flow may be less than the second venting volume flow. The first venting volume flow may also be greater than the second venting volume flow.

As an alternative or in addition, after the elapse of the predetermined first time period t1, in method step E a closing control signal is transmitted from the electronic control device 60 via the third data line 63 to the outlet valve 40, whereupon the outlet valve 40 fluidically separates the interior space 11 in the operating fluid container from the filler pipe 20.

It can be seen from FIG. 2a that the operating fluid level within the filler pipe 20 falls during the first time period t1 to a predetermined level within the filler pipe 20. During this time period, operating fluid that is in the filler pipe 20 continues to flow into the interior space 11 in the operating fluid container, which can be seen from the rising filling level of the operating fluid container 10 during the time period t1. It can be seen from the lower diagram of FIG. 2 that, after the elapse of the predetermined time period t1, the venting valve 20 and/or the outlet valve 40 is moved into its/their closed position.

If, after ending the filling process, the person filling the tank fills further operating fluid into the filler pipe 20 by means of the filling device 80 (6), the operating fluid level rises up within the filler pipe 20, since the venting valve 30 and/or the outlet valve 40 is/are closed. The rising of the operating fluid level within the filler pipe 20 can be seen in FIG. 2a.

In a method step F, it is determined whether a further filling stop of the filling device 80 has been performed (7). The filling stop is determined by means of one of the sound sensors 90. The sound sensors 90 transmit a signal representing a filling stop via the fourth data lines 64 to the electronic control device 60. If no filling stop has been performed, the method stays in method step F, whereas the method moves on to method step G if a further filling stop has been determined.

In method step G, an opening control signal or a series of intermittent opening control signals and closing control signals is/are transmitted from the electronic control device 60 via the second data line 62 to the venting valve 30, so that a given venting volume flow is established via the venting valve 30 (8). It can be seen from FIG. 2c that, in the exemplary embodiment represented, a venting volume flow is 50% of the maximum venting volume flow.

As an alternative or in addition, in method step G a (further) opening control signal is transmitted from the electronic control device 60 via the third data line 63 to the outlet valve 40, whereupon the outlet valve 40 is moved into an intermediate position between its open position and its closed position (9).

Since the venting volume flow through the venting valve 30 is reduced, a positive pressure builds up within the operating fluid container 10 during the topping up. This has the consequence that the operating fluid introduced into the filler pipe 20 can flow away more slowly into the interior space 11 in the operating fluid container. On account of the pressure buildup in the operating fluid container 10, the operating fluid level rises within the filler pipe 20, as can be seen from FIG. 2a. The operating fluid in this case rises up in the filler pipe 20 until a filling stop is performed by the filling device 80 (10).

After the elapse of a predetermined second time period t2, in method step H a closing control signal is transmitted from the electronic control device 60 via the second data line 62 to the venting valve 30, whereupon the venting valve 30 fluidically separates the interior space 11 in the operating fluid container from the atmosphere (11).

As an alternative or in addition, after the elapse of the predetermined second time period t2, in method step H a closing control signal is transmitted from the electronic control device 60 via the third data line 63 to the outlet valve 40, whereupon the outlet valve 40 fluidically separates the interior space 11 in the operating fluid container from the filler pipe 20.

It can be seen from FIG. 2a that the operating fluid level within the filler pipe 20 falls during the second time period t2 to a predetermined level within the filler pipe 20. During this time period, operating fluid that is in the filler pipe 20 continues to flow into the interior space 11 in the operating fluid container, which can be seen from the rising filling level of the operating fluid container 10 during the time period t2. It can be seen from FIG. 2c that, after the elapse of the predetermined second time period t2, the venting valve 20 and/or the outlet valve 40 is moved into its/their closed position.

LIST OF DESIGNATIONS

10 Operating fluid container/tank
11 Interior space in the operating fluid container
20 Filler pipe
30 Venting valve
31 Venting line
40 Outlet valve/nonreturn valve/check valve
50 Filling level sensor
51 Float (of the filling level sensor)
60 Electronic control device
61 First data line (between electronic control device and filling level sensor)
62 Second data line (between electronic control device and venting valve)
63 Third data line (between electronic control device and outlet valve)
64 Fourth data line (between electronic control device and structure-borne sound sensor)
70 Filter/adsorption filter/activated-carbon filter
80 Filling device/fuel-pump nozzle
90 Sound sensor/structure-borne sound sensor/vibration sensor/microphone
t1 (First) predetermined time period
t2 Second predetermined time period

What is claimed is:

1. A method for controlling a filling process of an operating fluid container, which is fillable by a filling device via a filler pipe opening out into the operating fluid container, wherein the operating fluid container has a venting valve, which is electrically actuable between an open position, in which the operating fluid container is fluidically connected to atmosphere, at least indirectly, by the venting valve, and a closed position, in which the operating fluid container is fluidically separated from the atmosphere by the venting valve, comprising:
    a) moving the venting valve into its open position;
    b) determining a filling level of the operating fluid container;
    c) reducing a venting volume flow through the venting valve if the filling level of the operating fluid container has reached or exceeded a predetermined shut-off filling level;
    d) determining a filling stop of the filling device; and
    e) moving the venting valve into its closed position after a predetermined time period after determining the filling stop; and
    wherein a first venting volume flow through the venting valve after a determination that the filling level of the operating fluid container has reached or exceeded the predetermined shut-off filling level, and before the beginning of the predetermined time period, differs from a second venting volume flow through the venting valve during the predetermined time period.

2. The method as claimed in claim 1, wherein the venting volume flow is changed by intermittently actuating the venting valve between its open position and its closed position.

3. The method as claimed in claim 1, further comprising:
    b1) determining a filling speed at which the operating fluid container is filled with the operating fluid; and
    b2) determining a reduction of the venting volume flow by which the venting volume flow through the venting valve is reduced after reaching the shut-off filling level, as a function of the filling speed, wherein the reduction of the venting volume flow is falling as the filling speed increases.

4. The method as claimed in claim 1, further comprising:
    f) determining a further filling stop of the filling device;
    g) setting a venting volume flow through the venting valve when the further filling stop is determined; and
    h) moving the venting valve into its closed position after a predetermined second time period after determining the filling stop.

5. The method as claimed in claim 4, wherein the predetermined second time period is a function of a difference between a target filling level and the determined filling level.

6. The method as claimed in claim 5, wherein the second time period is shorter than the predetermined time period, in which, in method step e), the venting valve or an outlet valve remains in the intermediate position between the open position and the closed position after determining the filling stop.

7. The method as claimed in claim 1, wherein the predetermined time period is a function of a difference between a target filling level and the determined filling level.

8. The method as claimed in claim 7, wherein the function is a function monotonously rising with the difference between the target filling level and the determined filling level, wherein, when there is a difference between the target filling level and the determined filling level of zero, the function is likewise zero.

9. The method as claimed in claim 1, further comprising:
b1) determining a filling speed at which the operating fluid container is filled with the operating fluid; and
b2) determining the predetermined shut-off filling level as a function of the filling speed, wherein the predetermined shut-off filling level is falling as the filling speed increases.

10. An operating fluid container system for a motor vehicle comprising:
at least one operating fluid container, an interior space of the operating fluid container is fillable with an operating fluid via a filler pipe that opens out into the operating fluid container;
at least one venting valve for aerating and/or venting the operating fluid container, wherein the venting valve is electrically actuable between an open position and a closed position, wherein, in the open position, the interior space in the operating fluid container is fluidically connected to atmosphere, at least indirectly, by the venting valve, and wherein, in the closed position, the interior space in the operating fluid container is fluidically separated from the atmosphere by the venting valve;
at least one filling level sensor to determine a filling level of the operating fluid in the operating fluid container; and
an electronic control device, which is coupled to the filling level sensor via a first data line to receive data, and which is coupled to the venting valve via a second data line to emit control signals; and
wherein the control device is configured to perform the method for controlling the filling process of the operating fluid container as claimed in claim 1.

11. The operating fluid container system as claimed in claim 10, wherein the venting valve is electrically adjustable discretely between the open position and the closed position.

12. The operating fluid container system as claimed in claim 10, wherein the venting valve is configured as a proportional valve and is electrically adjustable continuously between an open position and the closed position.

13. The operating fluid container system as claimed in claim 10, wherein:
the operating fluid container system also has an electrically actuable outlet valve, which is electrically actuable between an open position, in which the filler pipe is fluidically connected to the interior space in the operating fluid container, and a closed position, in which the filler pipe is fluidically separated from the interior space in the operating fluid container by the outlet valve.

14. The operating fluid container system as claimed in claim 10, further comprising:
the operating fluid container system has a sound sensor, by which a filling stop of a filling device inserted into the filler pipe is detectable; and
the sound sensor is connected by a data line to the control device to transmit data representing the filling stop to the control device.

* * * * *